United States Patent [19]
Struger

[11] 3,743,855
[45] July 3, 1973

[54] FAULT DETECTING AND FAULT PROPAGATING LOGIC GATE

[75] Inventor: Odo J. Struger, Milwaukee, Wis.

[73] Assignee: Allen-Bradley Company, Milwaukee, Wis.

[22] Filed: June 10, 1971

[21] Appl. No.: 151,674

[52] U.S. Cl................ 307/215, 307/202, 307/214, 307/218, 307/311, 328/7
[51] Int. Cl.... H03k 19/36, H03k 19/40, H02h 7/20
[58] Field of Search.................. 307/202, 208, 209, 307/213, 214, 215, 218, 297, 310, 311, 94; 328/2, 7, 8, 3; 317/31, 33 R, 124

[56] References Cited
UNITED STATES PATENTS

| | | | |
|---|---|---|---|
| 3,602,733 | 8/1971 | Aoki .................................. | 307/209 |
| 3,283,170 | 11/1966 | Buie............................. | 307/299 A X |
| 3,390,280 | 6/1968 | Thompson ................... | 307/299 A X |
| 3,214,640 | 10/1965 | Mills............................... | 317/31 |
| 3,401,274 | 9/1968 | Marsh............................. | 307/297 |
| 3,084,338 | 4/1963 | Mauer et al. .................. | 307/215 X |
| 3,227,922 | 1/1966 | Glaser et al.................... | 307/202 X |
| 3,229,119 | 1/1966 | Bohn et al. ..................... | 307/218 X |
| 3,325,680 | 6/1967 | Amacher ........................ | 307/311 X |
| 3,519,886 | 7/1970 | Spencer et al................... | 317/51 |
| 3,522,444 | 8/1970 | Lourie ............................. | 307/218 X |
| 3,590,325 | 6/1971 | McMillen........................ | 317/33 R |

OTHER PUBLICATIONS
Zee, "Optoelectronic Switch Monitors Line Power," Electronics (publication), p. 68, Vol. 43, No. 24, 11231970.

Primary Examiner—John W. Huckert
Assistant Examiner—L. N. Anagnos
Attorney—Barry E. Sammons and Arthur H. Seidel

[57] ABSTRACT

A logic gate has a fault sensing circuit connected to each of its input terminals and connected to actuate a switching means that open circuits the gate output terminal when there is no current flow either into or out of each gate input terminal. A first embodiment includes a photosensitive type current sensing circuit connected to the input terminal of a NOT gate. When a fault occurs at this terminal, a switching transistor actuates to turn off two drive transistors in a buffer circuit, which open circuits the output terminal. A second embodiment is similar but includes a transistor type current sensing circuit connected to the input terminal of a NOT gate. A third embodiment includes two fault sensing circuits connected to each of two input terminals of a NAND gate. Each fault sensing circuit connects to turn off the two drive transistors in a buffer circuit when a fault occurs at either input terminal. And finally, a fourth embodiment includes a fault sensing circuit connected to each of two input terminals of an AND gate, each circuit connected to deenergize a relay coil which opens a switch in the gate output terminal when a fault occurs at either input terminal.

11 Claims, 4 Drawing Figures

Patented July 3, 1973

INVENTOR
ODO J. STRUGER

BY Barry C. Sammons

ATTORNEY

INVENTOR
ODO J. STRUGER

BY Barry C. Sammons
ATTORNEY

INVENTOR
ODO J. STRUGER

BY Barry P. Sammons
ATTORNEY

FAULT DETECTING AND FAULT PROPAGATING LOGIC GATE

BACKGROUND OF THE INVENTION

The field of the invention is logic gates, and particularly, logic gates which are combined to form logic control circuits for operating machine tools, assembly lines and other industrial apparatus.

Logic controllers include a network of logic gates having inputs connected to receive signals from input devices such as limit switches, solenoids, photoelectric cells, push button, etc., and having outputs connected to control the various machine functions in response to the condition of the input devices. The logic gates used in such controllers may include AND gates, NAND gates, OR gates, NOR gates and NOT gates. Regardless of the number of gates, the type of gates, or their interconnection, such logic gates are each responsive to generate either a logic high or a logic low at an output terminal in response to the logic state of its input terminal(s). For example, an AND gate generates a logic high at its output terminal when logic highs are applied to all of its input terminals — otherwise, its output is low.

When controlling a machine tool such as a press, input devices located on the press are connected by means of wires to the input terminals of various logic gates in the controller. For example, such an input device may be a photoelectric cell which generates a positive voltage, or logic high, when the operator's hands are cleared from the press, and ground potential, or a logic low when it is unsafe to operate the press. The controller is responsive to the logic state generated by these various input devices to operate the machine tool.

As with relay controls used on machine tools, prior logic controllers are comprised of logic gates, each of which is responsive to generate solely a logic high or a logic low in response to any set of conditions applied to its input terminals. For example, a relay or a logic gate responds to a logic high or low at a particular input terminal by opening or closing a switch in the case of a relay, or generating a logic high or low at an output terminal in the case of a logic gate. If that input terminal becomes open circuited due to a malfunction, the relay or logic gate output still responds by assuming one of its two states.

Prior logic gates (and relays) do not recognize or interpret malfunctions at their input terminals, but instead, interpret them as either a logic high or a logic low. For example, if "current sinking" logic gates are used to control the press in the example above, and an open circuit occurs in the line leading from the photoelectric cell to the controller, the open circuit will be interpreted as a logic high by the logic gates in the controller. As a consequence, the controller may not be properly inhibited from actuating the press while the operator's hands are underneath it. To insure that such safety devices and interlocks are functioning properly, a substantial amount of additional circuitry must be added to logic controllers and relay controllers to detect malfunctions and shut down the controller before harm results. When controlling complex functions, such additional safety circuitry can become complex, costly and subject to malfunction.

SUMMARY OF THE INVENTION

The present invention comprises a logic gate which senses a malfunction, or open circuit, at its input terminal(s) and propagates this condition to the output terminal of the logic gate. More specifically, the invention comprises a logic gate having a fault sensing circuit connected to each of its input terminals and switching means connected to open circuit the logic gate output terminal when a fault sensing circuit detects a malfunction.

When combined with other similar logic gates, the logic gate of the present invention provides a controller which does not require additional safety circuitry. Regardless of the origination of a malfunction, the open circuit is sensed by the logic gate(s) connected to that point. Instead of generating a logic high or low at their output, these logic gates propagate the open circuit condition to their output terminal. As a result, subsequent logic gates and the output drive circuits of the controller are deactivated, or open circuited, and the controller is effectively shut down.

A general object of the invention is to provide a logic gate which is not only responsive to high and low logic states at its input terminal(s), but is also responsive to an open circuit to open circuit its output terminal. When a logic high is applied to an input terminal of the logic gate, current flows into that terminal, and conversely, when a logic low is applied to an input terminal of the logic gate, current flows out of that terminal. However, when a malfunction, or open circuit occurs, there is no current flow. This situation is sensed and used to operate the switch means which is connected to open circuit the logic gate output terminal.

Another general object of the invention is to provide a logic gate which is responsive to a malfunction condition at one or more of its input terminals to open circuit its output terminal. Such malfunctions include open circuit conditions and short circuit conditions.

Another object of the invention is to provide a logic gate as described above which can be economically constructed from discreet components, or can be economically constructed by integrated circuit techniques. The components necessary to sense the malfunction at the logic gate input terminal(s) and the switch means necessary to propagate that malfunction to the output terminal of the logic gate, may be standard resistors, transistors and diodes. Such components are easily constructed and connected by any of the techniques presently used to manufacture logic gates.

Still another object of the invention is to provide a means of indicating when and where a malfunction occurs in a logic controller or the devices to which it is attached. Because the switch means in the invented logic gate is only actuated when a malfunction occurs at a gate input, the state of the switch means in each logic gate can be read, and the source of the open circuit can thus be immediately pinpointed.

The foregoing and other objects and advantages of the invention will appear from the following description. In the description reference is made to the accompanying drawings which form a part hereof, and in which there is shown by way of illustration four preferred embodiments of the invention. The invention may be employed in many different embodiments, and reference is made to the claims herein for interpreting the breadth of the invention.

DESCRIPTION OF THE PREFERRED EMBODIMENTS

Figure 1:
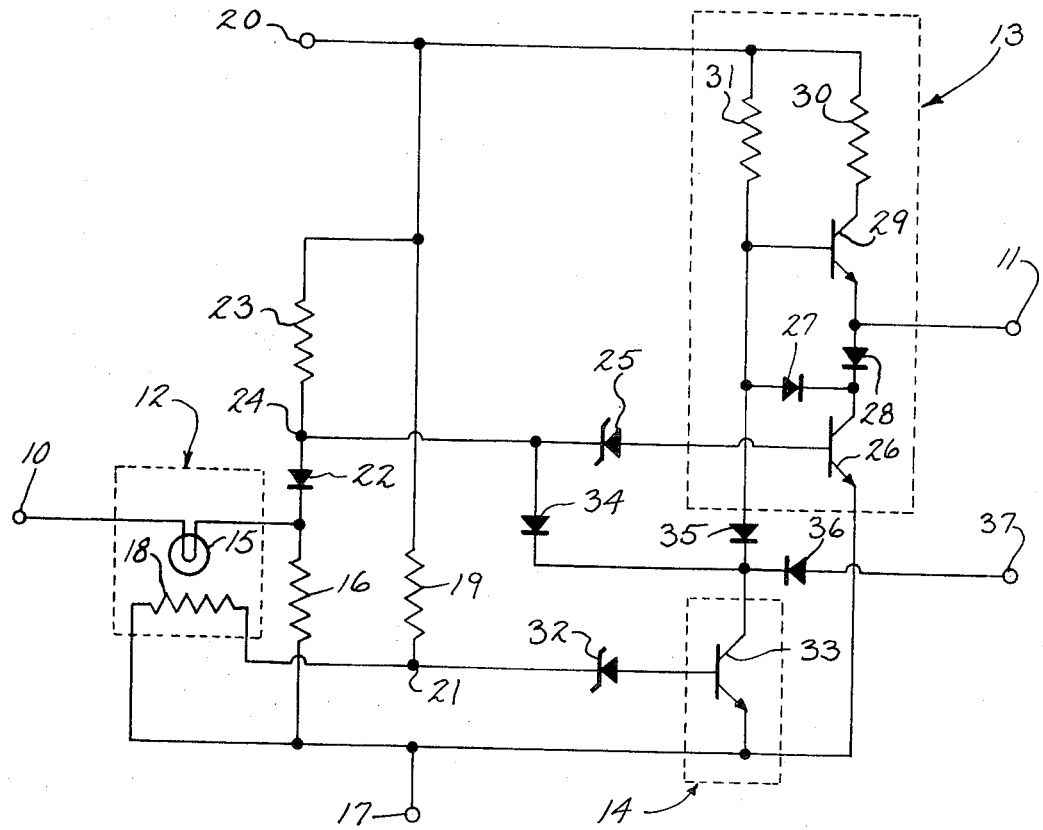
FIG. 1 is a circuit diagram of a NOT gate incorporating a first embodiment of the invention.

Referring to FIG. 1, the NOT gate shown therein includes an input terminal 10 which is connectable to receive a digital signal, and an output terminal 11 through which the inverse of the received digital signal is generated. The NOT gate is comprised of three primary elements: a current sensing circuit 12 connected to the input 10, a buffer circuit 13 connected to the current sensing circuit 12 and output terminal 11, and an electronic switch circuit 14 connected to both the current sensing circuit 12 and buffer circuit 13.

The current sensing circuit 12 includes an illuminating device 15 having one lead connected to the input terminal 10 and a second lead connected through an input resistor 16 to the negative terminal 17 of a d-c power supply (not shown in the drawing). The illuminating device 15 is also connected through a blocking diode 22 and a second input resistor 23 to a positive voltage terminal 20 of the d-c power supply. A photosensitive element 18 is mounted in close proximity to the illuminating device 15 and shielded from external light sources. A cadmium sulfide type element 18 is used for this purpose and has one lead connected directly to the negative terminal 17, and a second lead connected through a voltage divider resistor 19 to the positive supply terminal 20.

When a logic low is applied to the input terminal 10, current flows from the positive supply terminal 20, through the second input resistor 23, through the blocking diode 22, and through the illuminating device 15. When a logic high is applied to the input terminal 10, current flows into the input terminal 10, through the illuminating device 15, through the first input resistor 16, and to the negative supply terminal 17. Current flow either into or out of the logic gate input terminal 10, therefore, flows through the illuminating device 15 causing it to light and illuminate the cadmium sulfide element 18. The cadmium sulfide element 18 is essentially a resistor which combines with the resistor 19 to form a voltage divider network directly across the d-c power supply. When struck with light generated by the illuminating device 15, the resistance of the photosensitive element 18 decreases substantially, and the voltage at junction point 21 between the element 18 and resistor 19 drops. Thus, when current is flowing into or out of the logic gate input terminal 10, the voltage at the junction point 21 is relatively low, whereas when no current is flowing, junction point 21 is high.

Connecting the current sensing circuit 12 to the buffer circuit 13 is a coupling zener diode 25. Its cathode is connected to a connection point 24 between the blocking diode 22 and resistor 23, and its anode is connected to the base of a master drive transistor 26 in the buffer circuit 13. The emitter of the master drive transistor 26 is connected to the negative supply terminal 17 and its collector connects to the cathode of both a coupling diode 27 and a bias diode 28. The anode of the coupling diode 27 connects to the base of a slave drive transistor 29 and the anode of the bias diode 28 connects to the logic gate output terminal 11. The emitter of the slave drive transistor 29 also connects to the output terminal 11, its collector connects to the positive supply terminal 20 through a gate protection resistor 30, and its base connects to the positive supply terminal 20 through a bias resistor 31.

The digital signal applied to the gate input terminal 10 appears at connection point 24 and directly controls the master drive transistor 26, which in turn drives the slave drive transistor 29. For example, when the gate input terminal 10 and connection point 24 are at a logic high voltage, the base emitter junction of the master drive resistor 26 is forward biased and the transistor 26 is turned on. As a result, the logic gate output terminal 11 is driven through the bias diode 28 to a logic low voltage. The base of the slave transistor 29 is also driven to a low voltage through the coupling diode 27, thus turning off the slave transistor 29 rendering it non-conductive. On the other hand, when the logic gate input terminal 10 and connection point 24 are at a logic low voltage, coupling zener diode 25 blocks base current into the master drive transistor 26, turning it off. As a result, the base voltage of the slave drive transistor 29 rises and the base receives current through the bias resistor 31, turning on the slave drive transistor 29. As a result, the output terminal 11 is driven high by the transistor 29 and output current is supplied through the gate protection resistor 30.

In passing, it should be noted that in the logic gate thus far described above, as in prior logic gates generally, the gate output terminal 11 will be driven to either a logic high or a logic low voltage even when a malfunction occurs in the circuitry attached to the gate input terminal 10. More specifically, if the input terminal 10 is "floating" due to an open circuit, the voltage at the connection point 24 will be determined by the values of the first and second input resistors 16 and 23. Depending on the reverse breakdown voltage of the coupling zener diode 25, this voltage will either turn on or turn off the master drive transistor 26. The gate output terminal 11 will, therefore, be driven to either a logic high or logic low voltage when a malfunction occurs at the input terminal 10. It is this limited mode of operation of prior logic gates which necessitates external circuits to detect and interpret malfunctions in control systems. The current sensing circuit 12 described above and the electronic switch 14, now to be described, eliminate the need for such external circuitry.

Connecting the current sensing circuit 12 to the electronic switch 14 is a second coupling zener diode 32. Its cathode is connected to the photosensitive element 18 at the junction point 21 and its anode connects to the base of a switching transistor 33 in the electronic switch circuit 14. The emitter of the switching transistor 33 connects to the negative supply terminal 17, and its collector connects to the cathode of three coupling diodes 34, 35 and 36. The anode of the coupling diode 34 connects to the cathode of the first coupling zener diode 25, the anode of the coupling diode 35 connects to the base of the slave drive transistor 29, and the anode of the coupling diode 36 connects to a fault indicate terminal 37.

The electronic switch circuit 14 operates in combination with the buffer circuit 13 to disconnect, or open the logic gate output terminal 11 when the logic gate input terminal 10 is open circuited. When open circuited, the illuminating device 15 is not lit and the resistance of the cadmium sulfide photosensitive element 18 increases. As a result, the voltage at the junction point 21 rises above the reverse breakdown voltage of the second coupling zener diode 32. Base current then flows into the switching transistor 33 turning it on and driving the cathodes of the coupling diodes 34, 35 and 36 low, to approximately the negative voltage supply potential. The master drive transistor 26 is thus turned off through the coupling diode 34, and the slave drive transistor 29 is turned off through the coupling diode 35. Disconnection of the gate output terminal 11 is thus accomplished. A logic low voltage is generated at the fault indicate terminal 37 and can be used to drive an appropriate indicate device such as an incandescent or neon light. The value of voltage divider resistor 19 and the reverse breakdown voltage of the second coupling zener diode 32 are chosen such that when either a logic high or logic low is applied to the input terminal 10, the voltage at the junction point 21 is insufficient to generate base current to the switching transistor 33. As a result, when either a logic high or logic low is applied to the gate input terminal 10, the switching transistor 33 is turned off and the cathodes of the coupling diodes 34, 35 and 36 are released to allow normal operation of the buffer circuit 13 and to turn off the indicating device (not shown) attached to the fault indicate terminal 37. In this embodiment of the invention the buffer circuit 13 not only operates in its usual manner as an inverter and output drive circuit, but also as a means of disconnecting or open circuiting the gate output terminal 11.

Figure 2:
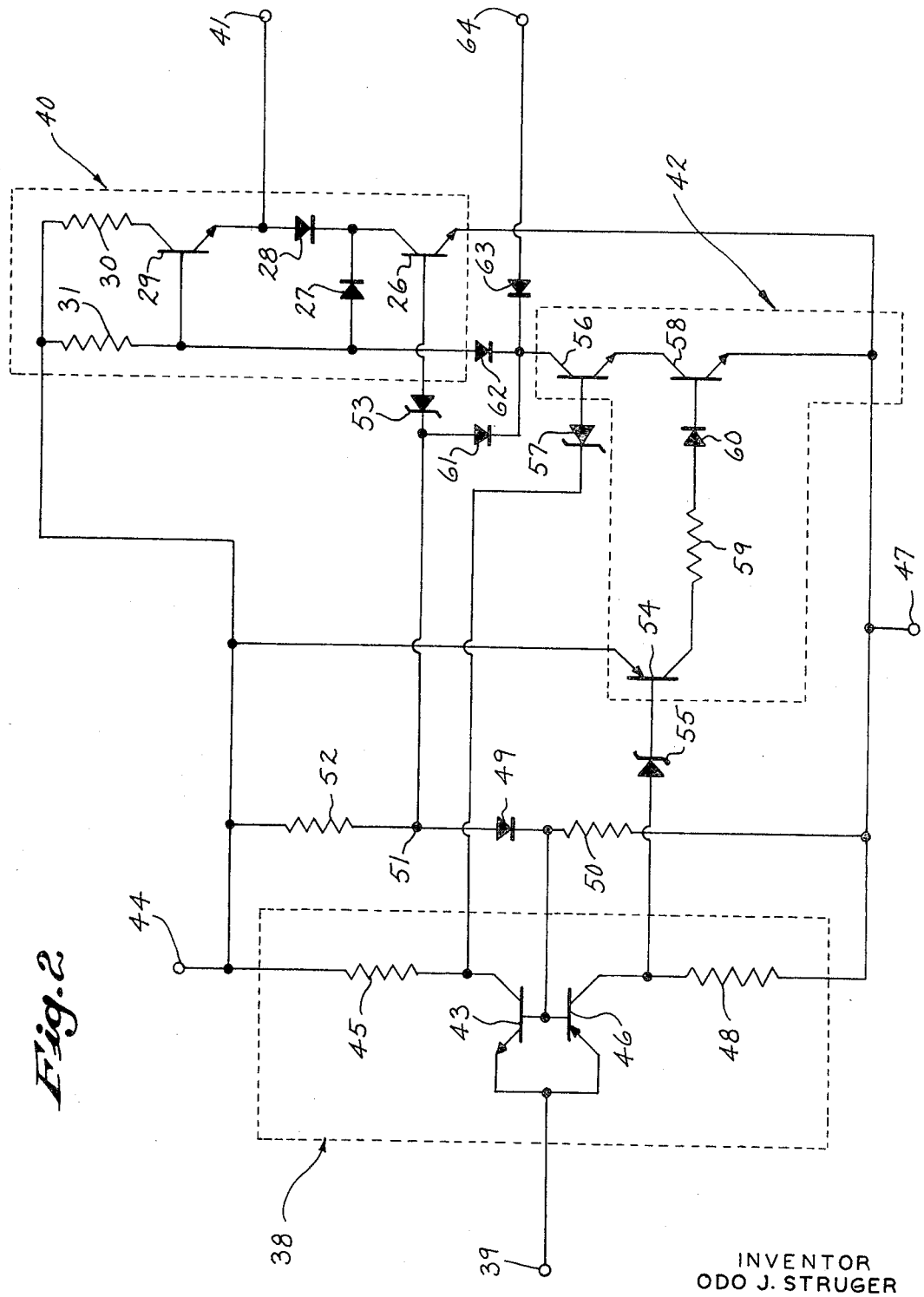
FIG. 2 is a circuit diagram of a NOT gate incorporating a second embodiment of the invention.

Referring to FIG. 2, the alternative NOT gate circuit shown therein also includes a current sensing circuit 38 connected to a logic gate input terminal 39, a buffer circuit 40 connected to the current sensing circuit 38 and a logic gate output terminal 41, and an electronic switch circuit 42 connected to both the current sensing circuit 38 and the buffer circuit 40. The buffer circuit 40 of this alternative circuit is identical to that described above, and consequently the components therein are designated by the same numbers.

The current sensing circuit 38 includes an NPN input transistor 43 with its emitter connected to the input terminal 39 and its collector connected to a positive supply terminal 44 through a load resistor 45. A PNP input transistor 46 has its emitter connected to the logic gate input terminal 39 and its collector connected to a negative supply terminal 47 through a second load resistor 48. The base of each transistor 43 and 46 is connected to the other and the bases are connected to the cathode of a blocking diode 49, and to the negative supply terminal 47 through a first voltage divider resistor 50. The anode of the blocking diode 49 is connected to a connection point 51 and through a second voltage divider resistor 52 to the positive supply terminal 44. The connection point 51 is connected to the base of the master drive transistor 26 in the buffer circuit 40 through a coupling zener diode 53.

When the gate input terminal 39 is driven by a logic high voltage, PNP transistor 46 becomes conductive, or turned on, and its base voltage rises. As a result, the blocking diode 49 is reverse biased and the voltage at the connection point 51 is driven high by the voltage at the positive voltage terminal 44 acting through the second voltage divider resistor 52. This logic high at the connection point 51 drives the gate output terminal 41 low through the coupling zener diode 53 and buffer circuit 40. When thus turned on, the collector of the PNP input transistor 46 is also driven to a logic high voltage.

When a logic low signal is applied to the gate input terminal 39, NPN input transistor 43 becomes conductive, or turned on, and both its base and collector are driven to a logic low voltage. Blocking diode 49 thus becomes forward biased and the voltage at the connection point 51 is driven to a logic low voltage through NPN input transistor 43. The coupling zener diode 53 becomes nonconductive and the gate output terminal 41 is driven by the buffer circuit 40 to a logic high voltage.

Under normal operating conditions, either the NPN input transistor 43 or the PNP input transistor 46 is conductive. When, however, a malfunction occurs in the circuitry connected to the gate input terminal 39, current is neither conducted into nor out of the input terminal 39 and both transistors 43 and 46 are nonconductive. To detect this malfunction, the collector of the PNP input transistor 46 is connected through a second coupling zener diode 55 to the base of an inverting transistor 54 in the electronic switch circuit 42. Also, the collector of the NPN input transistor 43 is connected through a third coupling zener diode 57 to the base of a first switch transistor 56 in the electronic switching circuit 42. The emitter of the inverter transistor 54 is connected to the positive supply terminal 44 and its collector is connected to the base of a second switch transistor 58 through a coupling resistor 59 and coupling diode 60. The emitter of the second switch transistor 58 is connected to the negative supply terminal 47 and its collector is connected to the emitter of the first switch transistor 56. The collector of the first switch transistor 56 is connected to the cathodes of three coupling diodes 61, 62 and 63. The anode of the coupling diode 62 is connected to the connection point 51, the anode of the coupling diode 62 is connected to the base of the slave drive transistor 29 in the buffer circuit 40, and the anode of the coupling diode 63 is connected to a fault indicate terminal 64.

When PNP input transistor 46 is nonconductive, or off, its collector voltage is driven low, turning on the inverter transistor 54. When the inverter transistor 54 conducts, it supplies base current to the second switch transistor 58 turning it on. On the other hand, when the PNP input transistor 43 is nonconductive, or off, its collector voltage is driven high, above the reverse breakdown voltage of the third coupling zener diode 57. Base current is thus supplied through zener diode 57 to turn on the first switch transistor 56. Thus, if a malfunction occurs and neither transistor 43 nor transistor 46 is conductive, both the first and second switch transistors 56 and 58 are turned on. As a result, the collector of the first switch transistor 56 is driven to a logic low voltage, and this low voltage is applied to the bases of the transistors 26 and 29 in the buffer circuit 40 turning them off. The gate output terminal 41 is thus disconnected and the malfunction, or open circuit, at the gate input terminal 39 is propagated to the output of the gate. As in the first embodiment shown in FIG. 1, the buffer circuit 40 herein provides the switching means to disconnect the gate output terminal 41. The current sensing circuit 33 and electronic switch circuit 42 operate in combination as a fault sensing circuit which is operable with the buffer circuit 40 to disconnect the output terminal 41 when an open circuit occurs at the gate input terminal 39.

Figure 3:
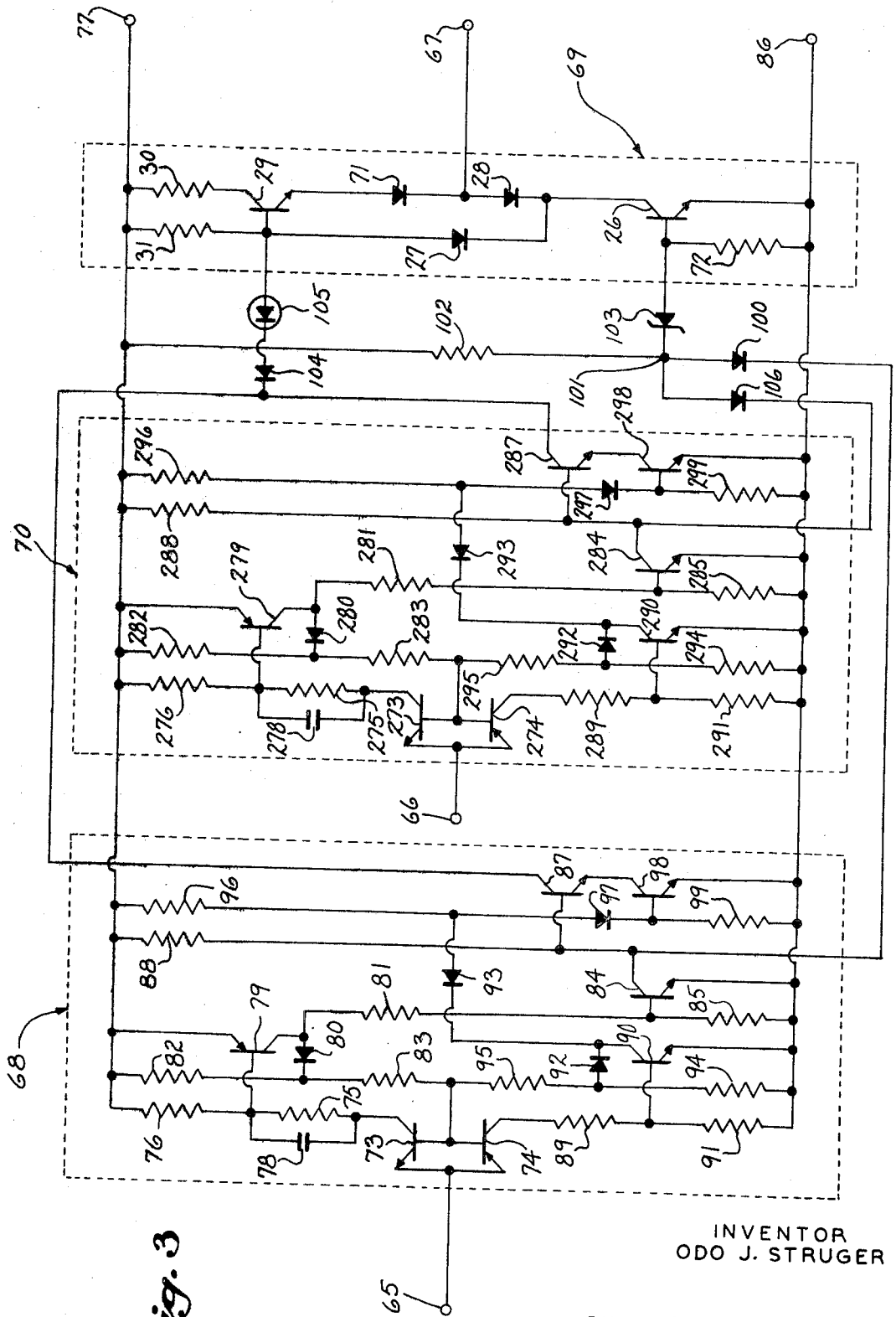
FIG. 3 is a circuit diagram of a NAND gate incorporating a third embodiment of the invention.

Referring to FIG. 3, a NAND gate has a first input terminal 65 and a second input terminal 66 which control the logic state of an output terminal 67. More specifically, the gate output terminal 67 is in a logic high state unless logic high input signals are applied to both gate input terminals 65 and 66. The first gate input terminal 65 is coupled through a first fault sensing circuit 68 to an output drive or buffer circuit 69, and the second gate input terminal 66 is coupled through a second fault sensing circuit 70 to the buffer circuit 69. The buffer circuit 69 is essentially the same as those described above, and therefore, like components therein have been designated with like numbers. Two additional components, a coupling diode 71 connected between the emitter of the slave drive transistor 29 and gate output terminal 67, and a leakage resistor 72 connected between the base of the master drive transistor 26 and ground, have been added to the circuit but do not change its operation from that described above.

The first fault sensing circuit 68 is designed to perform two basic functions. First, it couples the first gate input terminal 65 to the buffer circuit 69, and secondly, it operates to open circuit the gate output terminal 67 when the first gate input terminal 65 becomes open circuited. To perform these functions, the first fault sensing circuit 68 includes an NPN input transistor 73 and a PNP input transistor 74, each having its emitter connected to the gate input terminal 65. The collector of the NPN input transistor 73 connects through a first coupling resistor 75 and a first load resistor 76 to a positive terminal 77 of a d-c power supply (not shown in the drawing). The first coupling resistor 75 is shunted by a first coupling capacitor 78, and the connection point of the resistors 75 and 76 is connected to the base of an amplifier transistor 79. The emitter of the amplifier transistor 79 is connected to the positive supply terminal 77 and its collector connects to the anode of a clamping diode 80 and to one lead of a second coupling resistor 81. The cathode of the clamping diode 80 connects through a first voltage divider resistor 82 to the positive supply terminal 77, and through a second voltage divider resistor 83 to the base of each input transistor 73 and 74. The other lead of the second coupling resistor 81 connects to the base of an inverting transistor 84 and through a second load resistor 85 to a negative supply terminal 86 of the d-c power supply. The emitter of the inverting transistor 84 connects to the negative supply terminal 86 and its collector connects to the base of a first switching transistor 87 and through a third load resistor 88 to the positive supply terminal 77.

The collector of the PNP input transistor 74 connects through a third coupling resistor 89 to the base of a second amplifier transistor 90. The base of the second amplifier transistor 90 connects through a fourth load resistor 91 to the negative supply terminal 86, its emitter connects directly to the negative supply terminal 86, and its collector connects to the cathodes of a second clamping diode 92 and a coupling diode 93. The anode of the second clamping diode 92 connects through a third voltage divider resistor 94 to the negative supply terminal 86 and through a fourth voltage divider resistor 95 to the base of each input transistor 73 and 74. The anode of the coupling diode 93 connects through a fifth load resistor 96 to the positive supply terminal 77 and to the anode of a second coupling diode 97. The cathode of the second coupling diode 97 connects to the base of a second switching transistor 98 and through a leakage resistor 99 to the negative supply terminal 86. The emitter of the second switching transistor 98 is also connected to the negative supply terminal 86 and its collector is connected to the emitter of the first switching transistor 87.

The first fault sensing circuit 68 has a pair of connections to the buffer circuit 69. More specifically, the collector of the inverting transistor 84 is connected through a first AND diode 100 to a summing point 101. The summing point 101 connects through a bias resistor 102 to the positive supply terminal 77 and through a coupling zener diode 103 to the base of the master drive transistor 26 in the buffer circuit 69. Also, the collector of the first switching transistor 87 connects through a fault coupling diode 104 to the cathode of a light emitting diode 105. The anode of the light emitting diode 105 is connected to the base of the slave drive transistor 29 in the buffer circuit 69.

The fault sensing circuit 68 provides a unique response when a logic high, a logic low, or an open circuit is applied to the first gate input terminal 65. First, when a logic high is applied, PNP input transistor 74 becomes conductive and base current is supplied to the second amplifier transistor 90 turning it on. When turned on, the voltage at the collector of the second amplifier transistor 90 drops to that established at the junction of the third and fourth voltage divider resistors 94 and 95. This voltage is sufficiently low to shunt current supplied through the fifth load resistor 96 away from the base circuit of the second switching transistor 98. The second switching transistor 98 is thus turned off when the second amplifier transistor 90 is driven into conduction. The clamping diode 92 operating in combination with the third and fourth voltage divider resistors 94 and 95, prevent the second amplifier transistor 90 from going into saturation when turned on and thereby improve its switching speed.

When the first gate input terminal 65 is high as just described, NPN input transistor 73, amplifier transistor 79, and inverter transistor 84 are off. As a consequence, the collector of the inverter transistor 84 is driven to a logic high voltage by the third load resistor 88. The high is conveyed through the first AND diode 100 to the summing point 101.

When a logic low voltage is applied to the first gate input terminal 65, the NPN input transistor 73 becomes conductive, driving its collector to a logic low voltage. As a result, the base emitter junction of the amplifier transistor 79 becomes forward biased and base current flows to turn it on. The coupling capacitor 78 serves to speed up the switching response. The collector voltage of the amplifier transistor 79 is driven high to a voltage determined by the first and second voltage divider resistors 82 and 83 acting through the clamping diode 80. Current flows through the amplifier transistor 79, through the second coupling resistor 81, and into the base of the inverting transistor 84 to turn it on. The collector of the inverting transistor 84 is thus driven low and this logic low voltage is coupled to the summing point 101 by the first AND diode 100. Also, the logic low voltage at the collector of the inverting transistor 84 shunts current away from the base of the first switching transistor 87 turning it off.

In summary then, the collector of the inverting transistor 84 responds directly to a logic high or a logic low applied to the first gate input terminal 65, and either the first switching transistor 87 or the second switching transistor 98 is turned off when a logic high or a logic low is applied to the first gate input terminal 65.

When a malfunction occurs and the first gate input terminal 65 becomes open circuited, both input transistors 73 and 74 become nonconductive. As a result, both amplifier transistors 79 and 90 and inverting transistor 84 become nonconductive. Base current flows through the third load resistor 88 to turn on the first switching transistor 87 and base current flows through the fifth load resistor 96 and second coupling diode 97 to turn on the second switching transistor 98. The collector of the first switching transistor 87 is, therefore, driven to a logic low voltage, and this low is coupled by means of the fault coupling diode 104 and light emitting diode 105 to the base of the slave drive transistor 29 in the buffer circuit 69. The slave drive transistor 29 is thus turned off and current flows through the light emitting diode 105 to provide a visual indication of the fault. Also, the base of the first switching transistor 87 is driven low when the switching transistors 87 and 98 are both turned on. This logic low voltage is applied to the summing point 101 through the first AND diode 100. The voltage at the summing point 101 is therefore below the reverse breakdown voltage of the coupling zener diode 103 and the master drive transistor 26 is turned off. In summary, when the first gate input terminal 65 becomes open circuited, switching transistors 87 and 98 become conductive and the master and slave drive transistors 26 and 29 are turned off to open circuit the gate output terminal 67.

The second fault sensing circuit 70 operates in identical fashion to the first fault sensing circuit 68 described above. The components therein are also identical and have been designated by the same numbers, but with the addition of the prefix "2." The collector of the inverting transistor 284 is connected through a second AND diode 106 to the summing point 101 and the collector of the first switching transistor 287 is connected to the cathode of the fault coupling diode 104. Thus when a logic high is applied to the second gate input terminal 66, this high is coupled through the second AND diode 106 to the summing point 101, and when a logic low is applied to the second gate input terminal 66, it is likewise coupled to the summing point 101. When the second gate input terminal 66 becomes open circuited, both drive transistors 26 and 29 are turned off and the gate output terminal 67 is thus open circuited.

When both gate input terminals 65 and 66 are high, summing point 101 is driven to a logic high voltage through bias resistor 102. This voltage exceeds the reverse breakdown voltage of the coupling zener diode 103 and the master drive transistor 26 receives base current and become conductive to drive the gate output terminal 67 low. However, when either (or both) gate input terminal(s) 65 or (and) 66 is (are) low, the summing point 101 is held low, and the master drive transistor 26 is nonconductive. As described above, the slave drive transistor 29 is turned on as a result, and the gate output terminal 67 is driven high. When an open circuit occurs at either (or both) gate input terminal(s) 65 or (and) 66, summing point 101 is driven to a logic low voltage and base current is diverted away from the slave drive transistor 29 through diodes 104 and 105. As a result, both the master and slave drive transistors 26 and 29 become nonconductive, or turned off, and the gate output terminal 67 is thereby open circuited.

It should be noted that in the embodiments of the invention described above and shown in FIGS. 1–3, the logic gate buffer circuit is used as part of the means for disconnecting, or open circuiting, the gate output terminal when a malfunction occurs. It should not be implied from this, however, that the application of the invention is limited to a specific type of gate or to a specific type of buffer circuit. Instead, the application of the invention is entirely independent of these factors.

Figure 4:
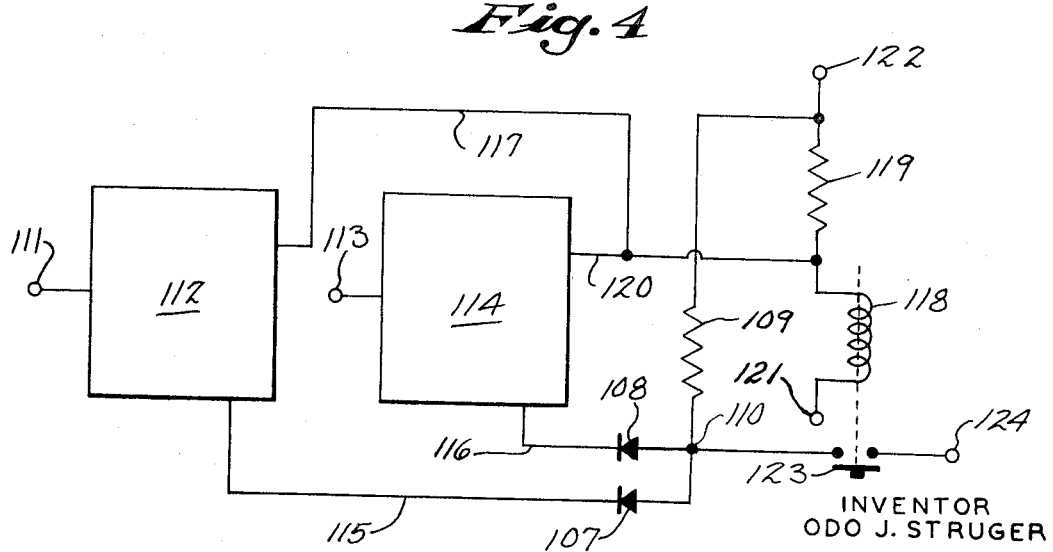
FIG. 4 is a circuit diagram of an AND gate incorporating a fourth embodiment of the invention.

For example, referring to FIG. 4, the invention is shown incorporated with an AND gate. The AND gate is comprised of a first AND diode 107, a second AND diode 108, and a bias resistor 109, each connected to a summing point 110. Connected between the AND gate circuit and the first gate input terminal 111 is a first fault sensing circuit 112. Similarly, connected between the AND gate circuit and a second gate input terminal 113 is a second fault sensing circuit 114. The fault sensing circuits 112 and 114 may be any of the three types described above.

For example, the first fault sensing circuit 112 may be identical to the first fault sensing circuit 68 shown in FIG. 3 and the second fault sensing circuit 114 may be identical to the second fault sensing circuit 70 also shown in FIG. 3. In this example, the cathode of the first AND diode 107 is connected through a lead 115 to the collector of the inverter transistor 84 in the first fault sensing circuit 112, and the cathode of the second AND diode 108 is connected through a lead 116 to the collector of the inverter transistor 284 in the second fault sensing circuit 114. The collector of the first switching transistor 87 in the first fault sensing circuit 112 is connected through a lead 117 to one lead of a relay coil 118 and one lead of a load resistor 119. Similarly, the collector of the first switching transistor 287 in the second fault sensing circuit 114 is connected through a lead 120 to the same leads of the relay coil 118 and load resistor 119. The other lead of the relay coil 118 connects to a negative supply terminal 121, and the other lead of the load resistor 119 connects to a positive supply terminal 122. The negative supply terminal 121 also connects to the first and second fault sensing circuits 112 and 114, as does the positive supply terminal 122. The positive supply terminal 122 also connects to the bias resistor 109. The relay coil 118 is magnetically coupled to operate a normally open switch 123 connected between the summing point 110 and a gate output terminal 124.

The AND gate shown in FIG. 4 functions to drive the gate output terminal 124 to a logic high voltage only when a logic high voltage is applied to both of its input terminals 111 and 113. When both input terminals 111 and 113 are high, the cathodes on both AND diodes 107 and 108 are high and the summing point 110 is driven to a logic high voltage through the bias resistor 109. The second switching transistors 98 and 298 in the respective fault sensing circuits 112 and 114 are turned off, and consequently, the leads 117 and 120 are not driven low. As a result, current is supplied through the load resistor 119 to the relay coil 118, energizing the same to thus close the normally open contacts 123. The logic high appearing at the summing point 110, is therefore, conducted to the gate output terminal 124.

If a logic low is applied to either (or both) input terminal(s) 111 or (and) 113, the cathode of either (both) the AND diode(s) 107 or (and) 108 is (are) low and the summing point 110 is held, or "clamped" at a logic low voltage. The leads 117 and 120 are still disconnected and the relay coil 118 remains energized to hold the normally open switch 123 closed to conduct the logic low voltage to the gate output terminal 124.

If a malfunction occurs and the first gate input terminal 111 becomes open circuited, both switching transistors 87 and 98 in the first fault sensing circuit 112 become conductive. As a result, the lead 117 is driven to the negative supply terminal potential and provides a shunt path around the relay coil 118 causing it to deenergize. The normally open switch 123 is released to open circuit the gate output terminal 124. Similarly, if an open circuit occurs at the second gate input terminal 113, the lead 120 is driven to the negative supply terminal potential causing the relay coil 118 to deenergize and the switch 123 to open.

It should be apparent to those skilled in the art that gate input terminals can be added to the circuit in FIG. 4 by merely adding additional AND diodes and additional fault sensing circuits. Regardless of the number of gate input terminals and regardless of their logic state, if one of them becomes open circuited, the relay coil 118 becomes deenergized and the gate output terminal is immediately open circuited by the open switch 123. It should also be apparent that electronic devices other than a relay may be substituted to disconnect the gate output terminal 124.

Finally, it should be apparent from the above description that the fault sensing circuit is responsive to malfunction conditions which result in no net current flow either into or out of the logic gate input terminal. One such malfunction is, of course, an open circuit condition, however, the fault sensing circuit may also respond to other malfunctions. For example, the positive and negative supply voltages applied to the gate can be selected such that the gate input terminals are at ground potential when open circuited. As a result, if the gate input terminal becomes short circuited to ground during operation, no current flows into or out of it and a malfunction is sensed and indicated by the fault sensing circuit. In other words, the term "malfunction condition" as used herein is intended to define any condition which results in no current flow into or out of the logic gate input terminal, and such a malfunction includes an open circuit and may incldue a short circuit to ground.

I claim:

1. In a logic gate having an input terminal adapted to receive a logic signal and an output terminal adapted to generate a logic signal in response to the logic state of the logic signal received at said input terminal, the improvement comprising:
   circuit means connected to said gate input terminal and said gate output terminal, said circuit means being operable to open circuit said gate output terminal in response to a malfunction condition sensed at said gate input terminal.

2. The logic gate as recited in claim 1, wherein said circuit means includes:
   a fault sensing circuit connected to said gate input terminal; and
   switching means connected to said fault sensing circuit and said gate output terminal.

3. In a logic controller comprised of a plurality of logic gates having input terminals and output terminals interconnected, the improvement comprising circuit means associated with each logic gate to detect an open circuit at any one of its input terminals and propagate that open circuit condition to its output terminal.

4. The logic controller as recited in claim 3 wherein the circuit means associated with each logic gate includes:
   a fault sensing circuit connected to detect an open circuit condition at a gate input terminal; and
   switching means connected to said fault sensing circuit and operable to open circuit the gate output terminal in response to an open circuit detected by said fault sensing circuit.

5. A logic gate having an output responsive to the logic state applied to an input, the combination comprising:
   a buffer circuit connected to said gate output and coupled to said gate input, said buffer circuit adapted to drive said gate output to a logic state in response to a logic state applied to said gate input; and
   a fault sensing circuit connected to said gate input and said buffer circuit, said fault sensing circuit operable to detect an open circuit condition at said gate input terminal and in response thereto drive said buffer circuit to open circuit said gate output.

6. The logic gate as recited in claim 5, wherein the fault sensing circuit includes a current sensing circuit connected to said gate input and an electronic switch circuit connected to said current sensing circuit and said buffer circuit, the current sensing circuit being responsive to actuate said electronic switch circuit when there is no current flowing into or out of said gate input, and said electronic switch circuit being responsive when actuated to drive said buffer circuit to open circuit said gate output.

8. The logic gate as recited in claim 6 wherein said current sensing circuit comprises:
   an illuminating device connected in circuit with said gate input; and
   a photosensitive element positioned to receive light from said illuminating device and adapted to generate a voltage responsive to the light generated by said illuminating device;
   whereby the voltage generated by said photosensitive element actuates said electronic switch circuit when the illuminating device is not lit.

8. The logic gate as recited in claim 6 including indicate means connected to said electronic switch circuit to provide visual indication when said electronic switch circuit is actuated.

9. The logic gate as recited in claim 8, wherein said buffer circuit includes:
   a master drive transistor connected between the gate output and a logic low voltage source, the control element of said master drive transistor being coupled to said gate input and said electronic switching circuit; and
   a slave drive transistor connected between the gate output and a logic high voltage source, the control element of said slave drive transistor being coupled to said master drive transistor and said electronic switching circuit;

wherein said electronic switch circuit turns off both the master and slave drive transistors when actuated.

10. The logic gate as recited in claim 7, wherein said electronic switch circuit is comprised of a first switching transistor and a second switching transistor and said electronic switching circuit is actuated when both switching transistors are actuated, and said current sensing circuit includes:
   a first input transistor connected to conduct current flowing into said gate input and connected to deactuate said first switching transistor in response to said conducted current; and
   a second input transistor connected to conduct current flowing out of said gate input and connected to deactuate said second switching transistor in response to said conducted current.

11. In a logic gate having a plurality of input terminals and an output terminal, the improvement comprising:
   switch means connected to said gate output terminal; and
   a plurality of fault sensing circuits, one connected to each gate input terminal to sense a malfunction condition at that terminal, and each one connected to said switch means to operate the switch means and to thereby open circuit said gate output terminal when a malfunction condition is sensed at its associated gate input terminal.

* * * * *

PO-1050
(5/69)

UNITED STATES PATENT OFFICE
CERTIFICATE OF CORRECTION

Patent No. 3,743,855            Dated July 3, 1973

Inventor(s) Odo J. Struger

It is certified that error appears in the above-identified patent and that said Letters Patent are hereby corrected as shown below:

Column 2, line 35,    "connectec" should be -- connected --

Column 3, line 20     "input 10" should be -- input terminal 10 --

Column 4, line 44     "etiher" should be -- either --

Column 6, line 51,    "PNP" should be -- NPN --

Column 8, line 49     "The" should be -- This --

Column 11, line 51    "incldue" should be -- include --

Column 12, line 42    claim "8." should be -- 7. --

Claim 10 is dependent on claim 8 and, therefore, the first line should be

-- The logic gate as recited in claim 8, wherein said --

Signed and sealed this 26th day of March 1974.

SEAL)
Attest:

EDWARD M. FLETCHER, JR.            C. MARSHALL DANN
Attesting Officer                   Commissioner of Patents